F. C. H. STRASBURGER.
FILLING MACHINE.
APPLICATION FILED MAY 18, 1909.
940,624. Patented Nov. 16, 1909.
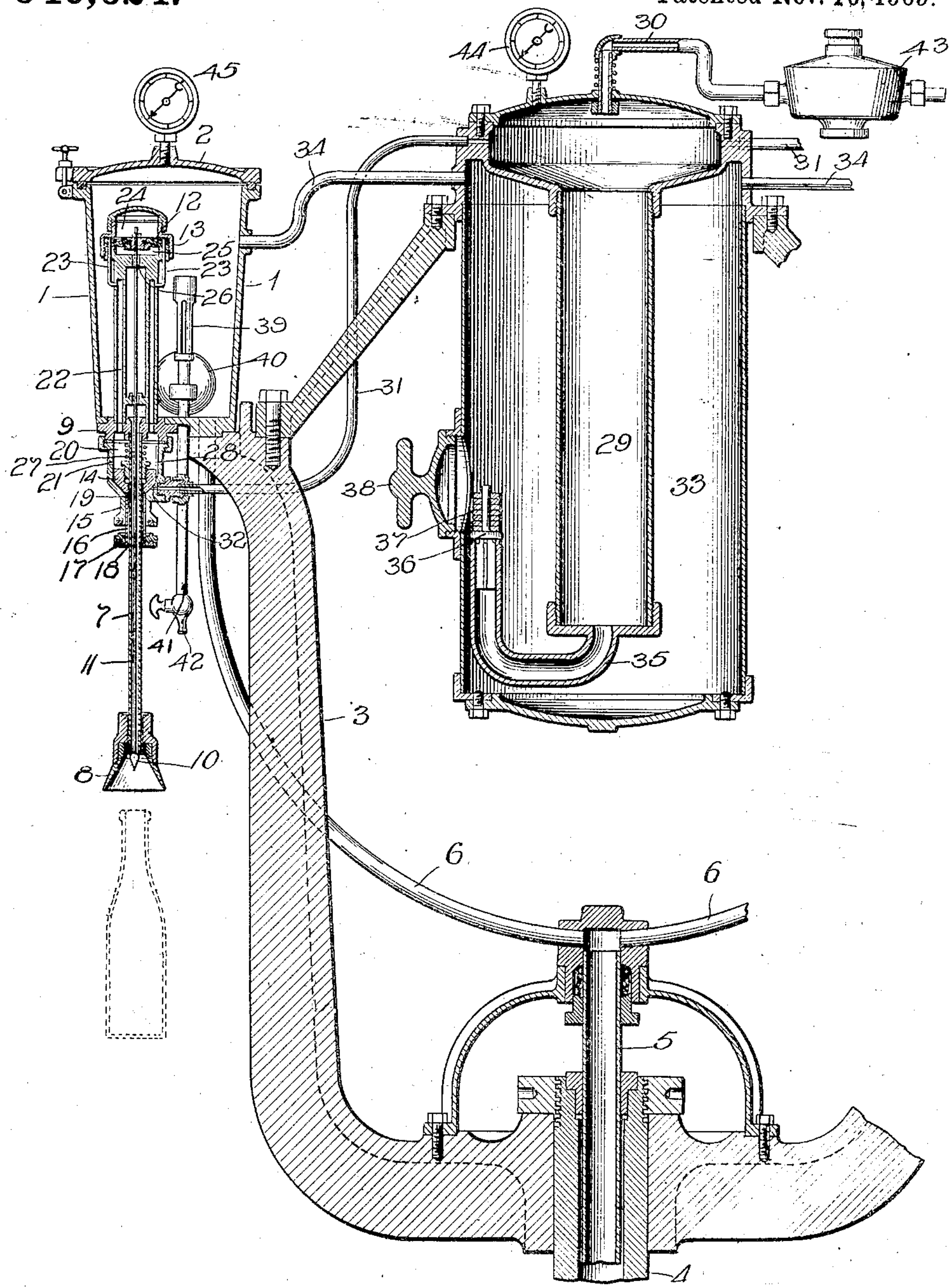
Witnesses
H. R. L. White
M. A. Kiddie
Inventor
Frank C. H. Strasburger
By Wm. F. Bell Atty.

UNITED STATES PATENT OFFICE.

FRANK C. H. STRASBURGER, OF CHICAGO, ILLINOIS, ASSIGNOR TO BOTTLERS MACHINERY MANUFACTURING COMPANY, OF CHICAGO, ILLINOIS, A CORPORATION OF ILLINOIS.

FILLING-MACHINE.

940,634. Specification of Letters Patent. Patented Nov. 16, 1909.

Application filed May 13, 1909. Serial No. 495,806.

*To all whom it may concern:*

Be it known that I, FRANK C. H. STRASBURGER, a citizen of the United States, residing at Chicago, in the county of Cook and State of Illinois, have invented new and useful Improvements in Filling-Machines, of which the following is a specification.

This invention relates to machines for filling beer into bottles and its object is, primarily, to accomplish the filling operation without liberating any of the gas contained in the beer or producing foam in the bottle, so that the bottle will be filled to a predetermined height and the beer in the bottle will hold all of its contained gas.

A further object of the invention is to provide automatically operated means of simple character for maintaining a fixed relation between the pressure on the beer in the tank and the pressure in the source of counter-pressure supply for the bottle so as to produce in every bottle before the beer begins to flow a pressure equal to the pressure of the beer in the filling tube at the top of the bottle and thus prevent the beer from being agitated as it enters the bottle to such extent as will liberate its gas and produce foaming.

In the accompanying drawing I have illustrated my invention embodied in a filling machine of the rotary type and the drawing shows a sectional view of so much of such a machine as is necessary to understand the construction and operation of the invention.

Referring to the drawing, 1 is the beer tank of the filling machine which is circular in shape in its complete form and is provided with a tightly fastened lid 2. This tank is supported on a suitable frame 3 which is mounted to revolve with a vertical hollow shaft 4. A beer supply pipe 5 is arranged in the hollow shaft 4 and is connected by branches 6 to the bottom of the beer tank.

The rotary type of filling machine comprises a plurality of filling valve mechanisms carried by a beer tank and means for automatically raising a bottle to filling position and opening the filling valve. In the drawing I have shown only a section of the tank and one filling mechanism, for convenience of illustration, and as the bottle raising means forms no part of this invention and may be of any suitable character I have not shown the same.

Any filling valve mechanism suitable for the purpose may be employed in connection with my invention and the one selected for illustration forms the subject-matter of my application Serial No. 469,434 filed December 26, 1908 for Letters Patent of the United States, to which reference is made for a more detail description. This mechanism comprises a filling tube 7 carrying a movable centering bell 8 and suspended from a body 9 which is suitably secured in an opening in the bottom of the tank. A liquid valve 10 is arranged to seal the lower end of the filling tube and is carried by rod 11 which is connected at its upper end to a diaphragm 12 secured in a casing 13. An air valve 14 is arranged in a casing 15 suspended from the body 9 and this valve has a sleeve 16 which extends downward below the casing and carries a head 17. An air passage 18 is provided between the filling tube 7 and the sleeve 17 and communicates with radial passages 19 in the valve. An air chamber 20 in the casing has an exhaust opening 21 and communicates through tubular members 22 and tubes 23 with the counter pressure chamber 24 above the diaphragm. A pressure chamber 25 below the diaphragm is in communication with the beer tank through the opening 26. Normally the counter pressure chamber 24 is open to the atmosphere through the tubes 23, tubular members 22, air chamber 20 and exhaust opening 21 and the pressure in the chamber 25, which is the pressure in the beer tank, operates on the diaphragm to hold the beer valve 10 closed. A spring 27 holds the air valve 14 closed. When the bottle is lifted it is properly centered by the bell 10 on the filling tube and as the bottle continues to rise it pushes the bell against the head 17 and opens the air valve to admit pressure from a source of supply through passage 32 in the casing and permit a counter pressure to be established in the bottle before the beer valve is opened. When the air valve is unseated it closes exhaust opening 21 and the pressure which enters the bottle is also permitted to flow through a by-pass 28, tubular members 22, and tubes 23 to the counter pressure chamber 24 above the diaphragm. Thus the pressure above the diaphragm is equalized with or made greater than the pressure below the diaphragm and this permits the beer valve to open. If the pressure on both sides of the diaphragm is equalized the beer valve will open by gravity and the weight of the column of beer sustained thereby; if there is a greater pressure above than below the diaphragm this will assist in opening the beer valve.

It has heretofore been the practice in some machines to equalize the pressure in the beer tank and the bottle by establishing communication therebetween before the beer begins to flow; it has been proposed to supply the pressure for the bottle from a source other than the beer tank; and it has also been proposed to provide a greater pressure in the bottle than in the beer tank and to furnish this pressure from a source of supply independent of the beer tank.

My invention contemplates means automatically operated for maintaining the proper relation between the pressure in the beer tank and the pressure in the source of supply for the bottle so as to provide in every bottle before the beer begins to flow a pressure equal to the pressure of the beer in the filling tube at the top of the bottle when the latter is in filling position.

The pressure of the beer in the filling tube at the top of the bottle comprises the pressure on the beer in the tank plus the hydrostatic head of the beer from the beer level in the tank to the top of the bottle. I provide in the bottle a pressure equal to the pressure of the beer in the filling tube at the top of the bottle to reduce the drop of the beer to a minimum consistent with the practical operation of filling the bottle. In other words I reduce the drop of the beer approximately to the length of the bottle, and entirely overcome the drop of the beer between the top of the bottle and the beer level in the tank. It is desired to fill the bottle and hence I provide a pressure which permits the beer to rise to the top of the bottle, approximately, and prevents it from rising higher. If this pressure is increased the beer will rise in the bottle only to a correspondingly lower level. The level to which the beer will rise in the bottle depends upon the pressure provided in the tank and by varying this pressure the quantity of beer admitted to the bottle may be varied accordingly. As it is desired to fill the bottle approximately I provide a pressure in the bottle equal to the pressure of the beer in the filling tube at the top of the bottle.

My improved variable pressure controlling means comprises a relatively high pressure chamber 29 which is connected by a pipe 30 with a source of counter pressure supply and by a pipe 31 with the valve casing 15. The pipe 31 communicates with an air passage 32 in said casing which is normally closed by the valve 14. A relatively low pressure chamber 33 is connected by one or more pipes 34 with the beer tank above the level of the beer therein. A pipe 35 is connected at one end to the chamber 29 and discharges into the chamber 33, being provided at its discharge end with a butterfly or other suitable valve 36. More than one pipe 35 may be provided if desired. Removable weights 37 are arranged on the valve 36 and they can be regulated as required to control the opening of the valve so as to maintain the proper relation of pressure for the beer tank and for the bottle. A screw plug 38 is arranged in the side of the chamber 33 so that access can readily be had to the valve 36 for changing the weights as required. For convenience the chamber 29 is preferably located within the chamber 33, as shown.

It is customary to provide a certain degree of pressure in the beer tank and if it is desired to provide a counter pressure in the bottle equal to the pressure of the beer in the filling tube at the top of the bottle when the latter is in filling position, a weight, or weights, corresponding to the hydrostatic head of the beer to the top of the bottle would be arranged on the valve 36. This weight will prevent the valve 36 from opening until the pressure on the beer in the tank falls below the pressure initially provided, in which event the valve would be opened by the higher pressure in the chamber 29 to increase the pressure in the chamber 33 and the beer tank until that pressure plus the weight 37 is equal to the pressure in the chamber 29. Thus the pressure supplied to the bottle from the chamber 29 and the pressure of the beer at the top of the bottle when the latter is in filling position always bear a certain fixed relation. This fixed relation is constantly maintained by reason of the fact that the valve 36 will automatically open to increase the pressure in the beer tank whenever the pressure therein falls below the amount initially provided.

Means of suitable character are preferably provided for regulating the supply of beer to the beer tank and as one means for accomplishing this result I have shown a float valve 39 which is fully set forth in my Letters Patent No. 883,254 dated March 31, 1908. This valve is operated by the float 40 when the beer falls below a predetermined level to permit the pressure accumulated in the tank to escape therefrom through the vent pipe 41 so that more beer may enter the tank and thus restore the predetermined level. A pet cock 42 is provided in the vent pipe to regulate the escape of pressure.

A reducing valve 43 is provided in the pipe 30 and pressure gages 44 and 45 are preferably provided for the high pressure chamber 29 and the filling machine tank 1, respectively.

In the practical operation of my improved filling machine let it be assumed that the filling machine is located on a floor above the vat containing the beer supply; that there is an initial pressure of ten pounds on the beer in the vat and that the initial hydrostatic head of the beer in the vat is five pounds, which will provide a pressure of fifteen pounds at the outlet from the bottom of the vat; and that it requires eight pounds of pressure to raise the beer from the outlet of the vat to the tank of the filling machine. This will produce a surplus initial pressure on the beer of seven pounds and consequently it is necessary to provide a counter-pressure of approximately seven pounds in the filling machine tank to stop the flow of beer from the vat to said tank. As the bottles are filled and the beer is drawn from the vat to supply the filling machine tank the hydrostatic pressure in the vat gradually decreases and my invention provides a means for correspondingly varying the pressure in the tank of the filling machine according to the variation of pressure on the beer in the vat by reason of the loss of hydrostatic pressure. I provide a pressure in the chamber 29 several pounds in excess of the initial pressure of the beer from the vat at the discharge end of the branches 6 of the beer supply pipe 5. As the bottles are filled and the beer in the filling machine tank falls below the predetermined level the float valve opens to permit the escape of pressure from said tank through the vent opening. This permits the beer to flow from the vat into the tank and when the predetermined level is restored the float valve is closed. The valve 36 operates automatically and when the predetermined level of the beer in the tank is restored the float valve will be closed and the pressure on the beer in the tank will rise until it is equal to the pressure in the high-pressure chamber 29 less the weight on the valve 36. Whenever the pressure on the beer in the tank plus the hydrostatic head above the discharge ends of the branches 6 becomes equal to or greater than the pressure of the beer at the discharge end of the branches 6 the beer is prevented from flowing into the tank but as soon as the beer in the tank falls below the predetermined level the float valve will again open to permit the escape of pressure from the tank thus reducing the pressure on the beer in the tank sufficiently to allow the beer to flow into the tank from the vat. This operation is repeated with very little variation in the level of the beer in the tank so that the pressure on the beer in the tank is constantly maintained in proper relation to the pressure of the beer at the discharge end of the branch supply pipes 6, and this pressure, it will be noted, constantly varies with the loss of hydrostatic pressure in the vat. As the beer is drawn from the vat, the hydrostatic pressure of the beer therein correspondingly falls and whenever the pressure on the beer in the tank plus the hydrostatic head above the discharge ends of the branches 6 exceeds the pressure of the beer from the vat at the discharge ends of pipe 6 the beer will be forced back through the pipes 6 and 5 to the vat, lowering the level of the beer in the tank. This will open the float valve and permit the escape of pressure from the tank. Then the beer will flow up into the tank to restore the predetermined level.

The inflow of the beer to the tank is intermittent. Assuming the conditions heretofore mentioned in which there is an initial hydrostatic head of the beer in the vat of five pounds and a counter-balance of approximately seven pounds in the tank, as the beer level in the vat lowers the hydrostatic head is correspondingly reduced. If, for example, one-half of the beer in the vat has been drawn off there will then be a hydrostatic head of two and one-half pounds which, with the ten pounds pressure on the beer in the vat, and less the eight pounds pressure to raise the beer to the tank, will leave a surplus of four and one-half pounds pressure instead of seven pounds at the discharge ends of the pipe 6. The controlling valve 36 is set to supply a pressure of seven pounds in the tank which would provide an excess of two and one half pounds pressure on the beer in the tank over and above the pressure of the beer from the vat at the discharge ends of pipe 6 and hence means must be provided for disposing of this excess pressure or otherwise the beer would be forced back through the pipe 6 into the vat. I accomplish this by means of the float valve which, as the excess pressure in the tank forces the beer back into the pipe 6, opens as the beer level in the tank lowers and permits the escape of the excess pressure in the tank. In other words, I reduce the pressure in the tank by allowing the excess pressure to escape and waste through the vent pipe 41 of the float valve and when the pressure in the tank is reduced to approximately four and one-half pounds the beer is permitted to flow into the tank through the pipe 6.

As the beer is being constantly drawn off from the tank during the filling operation the float valve will intermittently open and shut to exhaust the pressure from the tank and permit the beer to flow into the tank to replenish the supply as required. This operation is automatic and the effect is to maintain the pressure in the tank in proper proportion to the pressure of the beer in the vat at the discharge end of the pipe 6 and vary this pressure with the loss of hydrostatic head in the vat as the beer is drawn off in the filling operation. The float valve will continue to operate even when the filling operation is stopped because whenever the pressure in the tank exceeds the pressure on the beer at the discharge end of the pipe 6 the beer will be forced back into said pipe and this will allow the float valve to open, which permits the escape and waste of the excess pressure in the tank and in turn permits the beer to flow back into the tank from the pipe 6, and this operation continues indefinitely.

In this way the pressure in the tank is substantially maintained in its proper relation to the pressure of the inflowing beer, gradually reducing according to the loss of hydrostatic pressure in the vat. And the pressure at the top of the bottle also varies in proper correspondence to the variation of pressure in the tank, due to the loss of hydrostatic head in the vat, by reason of the operation of the weighted controlling valve 36. When the float valve opens and pressure escapes from the tank the controlling valve also opens and the pressure in the chamber 29 reduces.

The variable pressure controlling means, comprising the chambers 29 and 33 and the valve 36, would provide a constant pressure of seven pounds in the filling tank if it were not for the float valve which automatically operates to permit the escape of excess pressure in order that the effective pressure which is maintained in the tank shall be properly proportioned to the pressure of the beer in the vat at the discharge end of the pipe 6 and reduced in corresponding proportion to the reduction of hydrostatic head in the vat.

If it were not for the float valve operating automatically in the manner heretofore pointed out the excess pressure in the tank, after some beer is drawn from the vat, would be sufficient to force the beer back into the vat, but the automatically operating float valve prevents this.

In practice it is customary when the machine is to be stopped for the day to close the cock 41 and allow the pressure in the tank to force all the beer from the tank back into the vat so that the filling machine may be cleaned at the end of each day.

When the valve 36 is opened the pressure in the chamber 29 is reduced because the area of the outlet from the chamber 29 is greater than the area of the inlet opening and also because there is less pressure in the chamber 33 than in the chamber 29. The chamber 33 is connected with the tank by a number of pipes 34 so that the pressure in the chamber 33 reduces correspondingly with the reduction of pressure in the tank and for this reason also the pressure in the chamber 29 reduces when the valve 36 is opened. These operations of the float valve and controlling valve continue in rapid succession during the practical operation of the machine and, in fact, the variation in the level of the beer in the tank is very slight, while there is almost a constant escape of pressure through the float valve. The pressure in the tank and both chambers is constantly changing while the machine is in operation and this is due, it will be noted, to the loss of hydrostatic pressure from the vat and the filling of beer from the tank into the bottles.

With my invention the beer is filled into the bottles in a "dead" state, without foam or sufficient agitation to liberate its contained gas, and the construction is such that the pressures are automatically regulated as the filling operation proceeds. When the machine is once started in practical operation it requires no further attention, during the day, so far as the pressures are concerned, and this is of the greatest importance in filling beer where the pressure in the beer from the supply vat is constantly varying.

What I claim and desire to secure by Letters Patent is:

1. In a filling machine, the combination of a beer tank connected with a source of supply, a filling mechanism connected with the tank, means for supplying pressure on the beer in the tank, means for supplying counter-pressure to the bottle to be filled, and means for maintaining a difference between said pressure corresponding to the hydrostatic pressure of the beer in the tank to the top of the bottle when in filling position.

2. In a filling machine, the combination of a beer tank connected with a source of supply, a filling mechanism connected with the tank, means for supplying pressure on the beer in the tank, means for supplying counter-pressure to the bottle to be filled, means for maintaining a difference between said pressures corresponding to the hydrostatic pressure of the beer in the tank to the top of the bottle when in filling position, and means for automatically controlling the inflow of beer to the tank by permitting the escape of pressure therefrom.

3. In a filling machine, the combination of a beer tank, a connection between said tank and a source of beer supply under pressure, said pressure decreasing as the beer is used, a filling mechanism connected with the tank, means for supplying pressure on the beer in the tank, means for supplying counter-pressure to the bottle to be filled, means for maintaining a difference between said pressure in the tank and the counter-pressure corresponding to the hydrostatic pressure in the tank to the top of the bottle when in filling position, and means for controlling the supply of beer to the tank comprising a pressure exhaust, a valve in said exhaust, and a float for operating said valve and controlled by the level of the beer in the tank.

4. In a filling machine, the combination of a beer tank, a filling mechanism connected therewith, a high pressure chamber connected to a source of pressure supply and adapted to furnish pressure to the bottle to be filled, a low pressure chamber connected to the beer tank, a connection between said chambers, and a valve in said connection.

5. In a filling machine, the combination of a beer tank, a filling mechanism connected therewith, a high pressure chamber connected to a source of pressure supply and adapted to furnish pressure to the bottle to be filled, a low pressure chamber connected to the beer tank, a connection between said chambers, a valve in said connection, and a weight on said valve to control the operation thereof.

6. In a filling machine, the combination of a beer tank, a filling mechanism connected therewith, a high pressure chamber connected to a source of pressure supply and adapted to furnish pressure to the bottle to be filled, a low pressure chamber connected to the beer tank, a pipe connected to the high pressure chamber and discharging into the low pressure chamber, and a weighted valve in said pipe adapted to open when the pressure in the low pressure chamber and the tank falls below a predetermined degree.

7. In a filling machine, the combination of a beer tank, a filling mechanism connected therewith, a pressure chamber adapted to furnish pressure to the bottle to be filled, another pressure chamber connected with the beer tank, a connection between said chambers, a valve in said connection, and a weight on said valve, said weight corresponding to the difference between the pressure in the beer tank and the chamber connected therewith and the pressure desired to be furnished to the bottle.

8. In a filling machine, the combination of a beer tank, a filling mechanism connected therewith, an outer pressure chamber connected to the beer tank, another pressure chamber arranged within said outer pressure chamber and adapted to furnish pressure to the bottle to be filled, a pipe having one end connected to the inner chamber and its other end arranged to discharge in the outer chamber, and a controlling valve in said pipe.

9. In a filling machine, the combination of a beer tank, a filling mechanism connected therewith, an outer chamber connected with the beer tank, an inner chamber arranged within said outer chamber and adapted to furnish pressure to the bottle to be filled, said inner chamber being connected to a source of pressure supply, a pipe connected at one end to the inner chamber and having its discharge end arranged in the outer chamber, a valve at the discharge end of said pipe, and a weight on said valve, said weight being proportioned to the difference between the pressure on the beer in the tank and the pressure desired in the bottle.

FRANK C. H. STRASBURGER.

Witnesses:
WM. O. BELT,
M. A. KIDDIE.